(12) United States Patent
Igarashi

(10) Patent No.: US 11,695,660 B2
(45) Date of Patent: Jul. 4, 2023

(54) MONITORING SYSTEM, SETTING DEVICE, AND MONITORING METHOD

(71) Applicant: OMRON Corporation, Kyoto (JP)

(72) Inventor: Hisanori Igarashi, Muko (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 17/440,195

(22) PCT Filed: Mar. 4, 2020

(86) PCT No.: PCT/JP2020/009137
§ 371 (c)(1),
(2) Date: Sep. 17, 2021

(87) PCT Pub. No.: WO2020/195640
PCT Pub. Date: Oct. 1, 2020

(65) Prior Publication Data
US 2022/0150142 A1 May 12, 2022

(30) Foreign Application Priority Data

Mar. 28, 2019 (JP) .............................. JP2019-062274

(51) Int. Cl.
*H04L 43/045* (2022.01)
*H04L 43/08* (2022.01)
(52) U.S. Cl.
CPC ............ *H04L 43/045* (2013.01); *H04L 43/08* (2013.01)
(58) Field of Classification Search
CPC ............................... H04L 43/045; H04L 43/08
See application file for complete search history.

(56) References Cited

U.S. PATENT DOCUMENTS

| 8,565,755 | B1 * | 10/2013 | Badakere Ramachandra .............. H04L 1/24 370/242 |
| 9,786,197 | B2 * | 10/2017 | Asenjo ................... G06Q 10/06 |
| 2011/0138463 | A1 * | 6/2011 | Kim ..................... H04L 63/1458 726/22 |

(Continued)

FOREIGN PATENT DOCUMENTS

| CN | 101834760 | 9/2010 |
| CN | 106209870 | 12/2016 |

(Continued)

OTHER PUBLICATIONS

"International Search Report (Form PCT/ISA/210) of PCT/JP2020/009137," dated Jun. 9, 2020, with English translation thereof, pp. 1-4.

(Continued)

*Primary Examiner* — Viet D Vu
(74) *Attorney, Agent, or Firm* — JCIPRNET

(57) ABSTRACT

This monitoring system, which monitors communication related to an FA network, comprises: data collection units (253, 282, 260, 624) that collect data indicating a communication status on the FA network; a data analysis unit (622) that analyzes the collected data according to pre-registered information related to settings for communication on the FA network, and generates monitoring setting information for monitoring the communication; and monitoring units (251, 252, 1012, 1010) that monitor, according to the monitoring setting information, a communication to be monitored.

10 Claims, 18 Drawing Sheets

(56) References Cited

U.S. PATENT DOCUMENTS

| | | | |
|---|---|---|---|
| 2013/0155882 A1* | 6/2013 | Pendleton | H04L 43/0882 370/252 |
| 2014/0006338 A1* | 1/2014 | Watson | G06F 16/254 707/602 |
| 2018/0191520 A1 | 7/2018 | He | |
| 2019/0068521 A1* | 2/2019 | Kumar | G06F 15/7807 |
| 2019/0116100 A1* | 4/2019 | Porag | H04L 41/06 |

FOREIGN PATENT DOCUMENTS

| | | |
|---|---|---|
| CN | 108900538 | 11/2018 |
| EP | 3557354 | 10/2019 |
| JP | 2002325095 | 11/2002 |
| JP | 2015159482 | 9/2015 |
| JP | 2018097839 | 6/2018 |
| WO | 2006069041 | 6/2006 |

OTHER PUBLICATIONS

"Written Opinion of the International Searching Authority (Form PCT/ISA/237) of PCT/JP2020/009137," dated Jun. 9, 2020, with English translation thereof, pp. 1-6.

"Office Action of China Counterpart Application" with English translation thereof, dated Jun. 8, 2022, p. 1-p. 15.

"Search Report of Europe Counterpart Application", dated Nov. 14, 2022, p. 1-p. 11.

\* cited by examiner

| | Transmission source device name | Transmission source IP | Transmission destination device name | Transmission destination IP | Transmission source manufacturer | Transmission source MAC address | Protocol | TCP/UDP port | Communication content | Actual communication band | Action |
|---|---|---|---|---|---|---|---|---|---|---|---|
| R1 | Production PLC-A | 192.168.250.1 | Line PLC-A | 192.168.250.2 | Company A | 000016:123456 | OPC-UA | Tcp:4800 | Production information | 100Kbit/s | [Reject] [Monitor] |
| R2 | Line PLC-A | 192.168.250.2 | Production PLC-A | 192.168.250.1 | Company A | 000016:123456 | EtherNet/IP | Udp:2222 | Recipe | 10Kbit/s | [Reject] [Monitor] |
| R3 | Sensor | 192.168.250.3 | Production PLC-A | 192.168.250.1 | Company C | 00ZZXX:123456 | modbusTCP | TCP:502 | Sensor information | 1Kbit/s | [Reject] [Monitor] |
| R4 | unknown | 192.168.250.1 | Production PLC-A | 192.168.250.1 | Company B | 00YYXX:123456 | unknown | TCP:8080 | unknown | 10Mbit/s | [Reject] [Monitor] |

FIG. 11

```
if str_A == TRUE then
   Function_DataClear();
Endif;
```

FIG. 17

MONITORING SYSTEM, SETTING DEVICE, AND MONITORING METHOD

CROSS-REFERENCE TO RELATED APPLICATION

This application is a 371 application of the International PCT application serial no. PCT/JP2020/009137, filed on Mar. 4, 2020, which claims the priority benefits of Japan Patent Application No. 2019-062274, filed on Mar. 28, 2019. The entirety of each of the above-mentioned patent applications is hereby incorporated by reference herein and made a part of this specification.

BACKGROUND

Technical Field

The invention relates to monitoring communication in an FA (Factory Automation) network.

Description of Related Art

Nowadays, various terminals can be easily connected to a network. On the other hand, various problems related to security on the network arise, and the extent of the impact is also increasing.

Japanese Laid-Open No. 2015-159482 (Patent Document 1) discloses a network device located between an IP network and a plurality of terminals. The purpose of this network device is to set the terminals that can connect to the IP network and to construct a secure IP network even if the user does not have special expertise in the network. The network device learns the address when receiving a packet from the terminal. If the address cannot be learned, the network device determines whether or not the received packet should be transferred based on the address included in filter information.

RELATED ART

Patent Document

[Patent Document 1] Japanese Laid-Open No. 2015-159482

SUMMARY

Problems to be Solved

A control device such as a PLC (programmable logic controller) is used to control various facilities and various devices arranged in each facility. With the progress of ICT (Information and Communication Technology) in recent years, the control device is also connected to various external devices via a network, and the processing executed by the control device also becomes more sophisticated. The network at the site of FA (Factory Automation) has various names such as an industrial network, an FA network, and a field network, but the term "FA network" is used hereinafter.

With the networking or intelligence of a control system, the types of threats that can be expected are also increasing. However, at the site of FA, a wide variety of communication is executed according to the production equipment. Therefore, when monitoring the security of the network, it is difficult to judge whether the network is normal or abnormal.

In many cases, the user does not have a high level of expertise in communication technology. For this reason, it is common that the user does not know the specific content of the communication processing actually performed such as the details of the protocol. Therefore, the user often does not manage the communication processing related to the operation of the control system. Furthermore, an engineer with expertise related to the security of the FA network is not always stationed at the manufacturing site.

Therefore, one objective of the invention is to make it possible to monitor communication in an FA network.

Means for Solving the Problems

An example of the disclosure is a monitoring system monitoring communication related to an FA network. The monitoring system includes: a data collection unit collecting data indicating a status of communication on the FA network; a data analysis unit analyzing the data collected according to pre-registered information related to a setting of the communication on the FA network, and generating monitoring setting information for monitoring the communication; and a monitoring unit monitoring communication to be monitored according to the monitoring setting information.

According to the above, it is possible to monitor the communication on the FA network. The data collection unit acquires the data indicating the status of the communication on the FA network. The data analysis unit analyzes the data. As a result, it is possible to grasp the status of the communication on the FA network. By setting for monitoring based on the status, it is possible to monitor the communication on the FA network.

Preferably, the monitoring setting information includes a threshold value of a bandwidth of the communication to be monitored, and the monitoring unit outputs a notification to a user when the bandwidth exceeds the threshold value.

According to the above, when the bandwidth exceeds the threshold value, such as when a DoS attack (Denial of Service attack) or a DDoS attack (Distributed Denial of Service attack) is received, the monitoring unit can output the notification to the user.

Preferably, the monitoring system further includes a display unit. The data includes an address of a transmission source, an address of a transmission destination, a frequency of data exchange, and a total amount of communication data. The pre-registered information includes a name of the transmission source, a name of the transmission destination, and a name indicating communication between the transmission source and the transmission destination. The data analysis unit generates actual communication information in which the data is associated with the pre-registered information, and displays the actual communication information on the display unit.

According to the above, the actual communication information can be presented to the user so that the user can easily grasp the current status of the communication load. Therefore, it is possible to assist the user in setting security.

Preferably, the data analysis unit is configured to receive input of a user for selecting options of an action for the communication between the transmission source and the transmission destination, and generate the monitoring setting information. The options of the action include: monitoring of the communication between the transmission source and the transmission destination, and rejection of the communication between the transmission source and the transmission destination.

According to the above, the user can take measures related to security based on the result of data collection. For example, it is possible to reject communication that is considered clearly abnormal.

Preferably, the monitoring unit is included in a control device connected to the FA network. According to the above, it is possible to set the security of the communication of the control device. Further, after the setting, the communication can be monitored by the control device itself.

An example of the disclosure is a setting device for a monitoring system monitoring communication related to an FA network. The monitoring system includes a monitoring unit that monitors the communication according to monitoring setting information, and the setting device includes: a data collection unit collecting data indicating a status of communication on the FA network; and a data analysis unit analyzing the data collected according to pre-registered information related to a setting of the communication on the FA network, and generating the monitoring setting information for monitoring the communication.

According to the above, the monitoring system can be set so that the communication in the FA network can be monitored.

An example of the disclosure is a monitoring method of a monitoring system monitoring communication related to an FA network. The monitoring method includes: a step in which a data collection unit of the monitoring system collects data indicating a status of communication on the FA network; a step in which a data analysis unit of the monitoring system analyzes the data collected according to pre-registered information related to a setting of the communication on the FA network, and generates monitoring setting information for monitoring the communication; and a step in which a monitoring unit of the monitoring system monitors communication to be monitored according to the monitoring setting information.

According to the above, it is possible to monitor the communication in the FA network.

Effects

According to the invention, it is possible to monitor communication in an FA network and set for the monitoring.

BRIEF DESCRIPTION OF THE DRAWINGS

FIG. 11 is a diagram showing an embodiment of a user interface screen shown in FIG. 10.

FIG. 17 is a diagram showing an example of a part of a PLC program.

DESCRIPTION OF THE EMBODIMENTS

Figure 1:
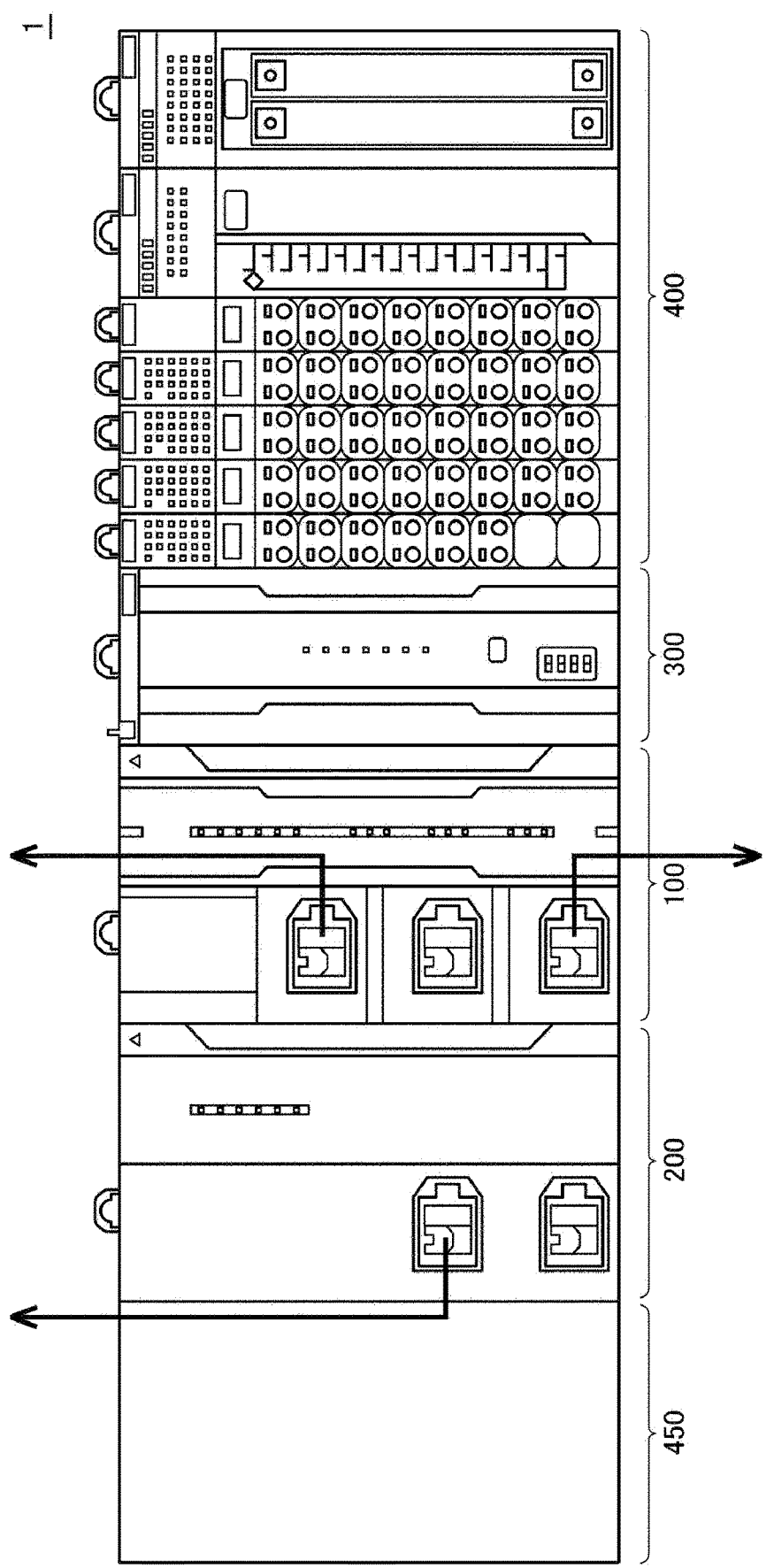
FIG. 1 is an external view showing a configuration example of a control device according to the present embodiment.

Embodiments of the invention will be described in detail with reference to the drawings. The same or corresponding parts in the drawings are denoted by the same reference numerals and the description thereof will not be repeated.

A. CONTROL DEVICE

First, a control device 1 that performs communication to be monitored in a monitoring system according to the present embodiment will be described.

FIG. 1 is an external view showing a configuration example of the control device 1 according to the present embodiment. With reference to FIG. 1, the control device 1 includes a control unit 100, a communication unit 200, a safety unit 300, one or a plurality of function units 400, and a power supply unit 450.

The control unit 100 and the communication unit 200 are connected via an arbitrary data transmission line (for example, PCI Express (registered trademark) or Ethernet (registered trademark)). The control unit 100 and the safety unit 300 and one or a plurality of function units 400 are connected via an internal bus (not shown).

The control unit 100 executes a central process in the control device 1. The control unit 100 executes a control operation for controlling a control target according to an arbitrarily designed requirement specification. The control operation executed by the control unit 100 is also referred to as "standard control" in comparison with a control operation executed by the safety unit 300 described later. In the configuration example shown in FIG. 1, the control unit 100 has one or a plurality of communication ports.

The communication unit 200 is connected to the control unit 100 and is in charge of a security function for the control device 1. In the configuration example shown in FIG. 1, the communication unit 200 has one or a plurality of communication ports. The details of the security function provided by the communication unit 200 will be described later.

The safety unit 300, independently of the control unit 100, executes the control operation for realizing a safety function related to the control target. The control operation executed by the safety unit 300 is also referred to as "safety control". Usually, the "safety control" is designed to meet a requirement for realizing the safety function specified in IEC 61508, etc. The "safety control" is a general term for the processing for preventing human safety from being threatened by equipment or machinery.

The function unit 400 provides various functions for realizing control for various control targets of the control device 1. The function unit 400 may typically include an I/O unit, a safety I/O unit, a communication unit, a motion controller unit, a temperature adjustment unit, a pulse counter unit, etc. Examples of the I/O unit include a digital input (DI) unit, a digital output (DO) unit, an analog input (AI) unit, an analog output (AO) unit, a pulse catch input unit and a composite unit in which a plurality of types are mixed. The safety I/O unit is in charge of I/O processing related to the safety control.

The power supply unit 450 supplies power of a predetermined voltage to each unit constituting the control device 1.

B. HARDWARE CONFIGURATION EXAMPLE OF EACH UNIT

Next, a hardware configuration example of each unit constituting the control device 1 according to the present embodiment will be described.

(b1: Control Unit 100)

Figure 2:
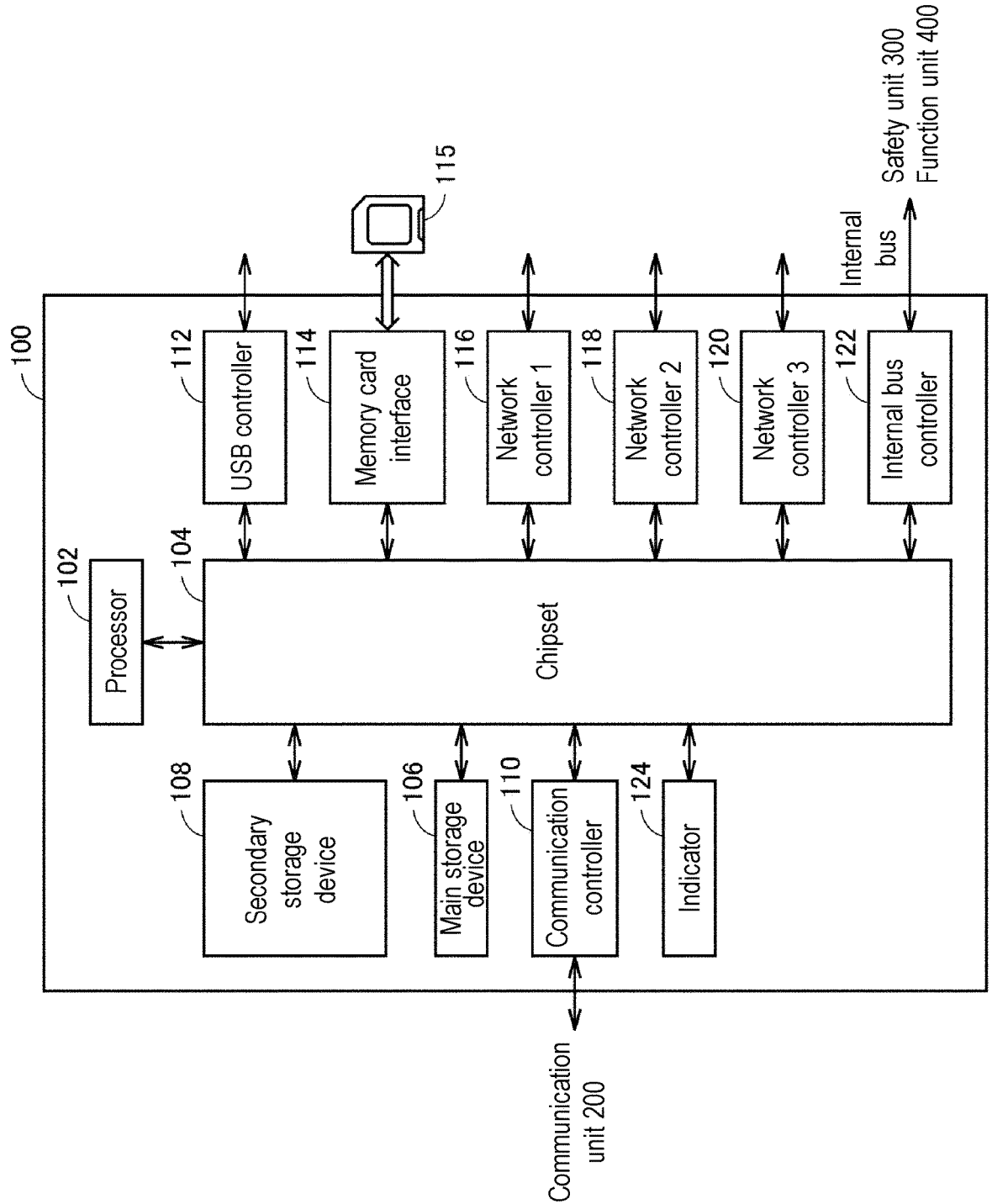
FIG. 2 is a schematic diagram showing a hardware configuration example of a control unit constituting the control device according to the present embodiment.

FIG. 2 is a schematic diagram showing a hardware configuration example of the control unit 100 constituting the control device 1 according to the present embodiment. With reference to FIG. 2, the control unit 100 includes, as main components, a processor 102 such as a CPU (Central Processing Unit) and a GPU (Graphical Processing Unit), a chipset 104, a main storage device 106, a secondary storage device 108, a communication controller 110, a USB (Universal Serial Bus) controller 112, a memory card interface 114, network controllers 116, 118, and 120, an internal bus controller 122, and an indicator 124.

The processor 102 reads various programs stored in the secondary storage device 108, and expands and executes the programs in the main storage device 106, so as to realize the control operation related to standard control and various processes as described later. The chipset 104 realizes the processing of the control unit 100 as a whole by mediating the exchange of data between the processor 102 and each component.

In addition to a system program, the secondary storage device 108 stores a control program that operates in an execution environment provided by the system program.

The communication controller 110 is in charge of exchanging data with the communication unit 200. As the communication controller 110, for example, a communication chip corresponding to PCI Express or Ethernet can be adopted.

The USB controller 112 is in charge of exchanging data with an arbitrary information processing device via USB connection.

The memory card interface 114 is configured so that a memory card 115 can be attached thereto and detached therefrom, and is capable of writing data such as the control program and various settings to the memory card 115 or reading data such as the control program and various settings from the memory card 115.

Each of the network controllers 116, 118, and 120 is in charge of exchanging data with an arbitrary device via a network. The network controllers 116, 118, and 120 may employ industrial network protocols such as EtherCAT (registered trademark), EtherNet/IP (registered trademark), DeviceNet (registered trademark), and CompoNet (registered trademark).

The internal bus controller 122 is in charge of exchanging data with the safety unit 300 and one or a plurality of function units 400 constituting the control device 1. A manufacturer-specific communication protocol may be used for the internal bus, or a communication protocol that is the same as or compliant with any of the industrial network protocols may be used.

The indicator 124 notifies an operating state or the like of the control unit 100, and is composed of one or a plurality of LEDs arranged on a surface of the unit.

FIG. 2 shows a configuration example in which the required functions are provided by the processor 102 executing programs, but some or all of these provided functions may be implemented by using a dedicated hardware circuit (for example, ASIC (Application Specific Integrated Circuit) or FPGA (Field-Programmable Gate Array)). Alternatively, the main part of the control unit 100 may be realized by using hardware that follows a general-purpose architecture (for example, an industrial personal computer based on a general-purpose personal computer). In this case, a plurality of OSs (Operating Systems) having different uses may be executed in parallel by using a virtualization technology, and the required applications may be executed on each OS.

(b2: Communication Unit 200)

Figure 3:
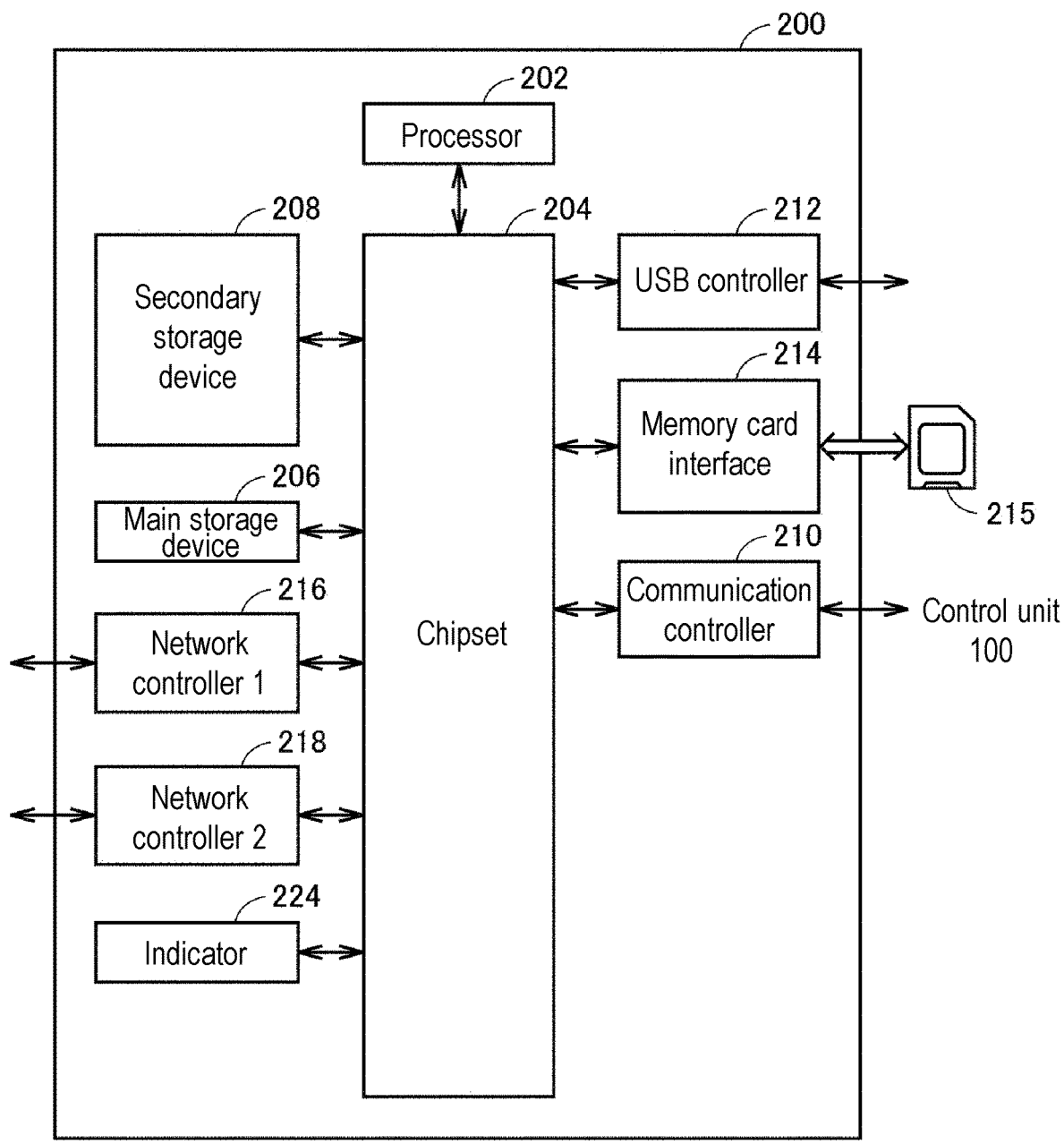
FIG. 3 is a schematic diagram showing a hardware configuration example of a communication unit constituting the control device according to the present embodiment.

FIG. 3 is a schematic diagram showing a hardware configuration example of the communication unit 200 constituting the control device 1 according to the present embodiment. With reference to FIG. 3, the communication unit 200 includes, as main components, a processor 202 such as a CPU and a GPU, a chipset 204, a main storage device 206, a secondary storage device 208, a communication controller 210, a USB controller 212, a memory card interface 214, network controllers 216 and 218, and an indicator 224.

The processor 202 reads various programs stored in the secondary storage device 208, and expands and executes the programs in the main storage device 206, so as to realize various security functions as described later. The chipset 204 realizes the processing of the communication unit 200 as a whole by mediating the exchange of data between the processor 202 and each component.

In addition to a system program, the secondary storage device 208 stores a security system program that operates in an execution environment provided by the system program.

The communication controller 210 is in charge of exchanging data with the control unit 100. As the communication controller 210, for example, a communication chip corresponding to PCI Express or Ethernet can be adopted in the same manner as the communication controller 110 of the control unit 100.

The USB controller 212 is in charge of exchanging data with an arbitrary information processing device via USB connection.

The memory card interface 214 is configured so that a memory card 215 can be attached thereto and detached therefrom, and is capable of writing data such as the control program and various settings to the memory card 215 or reading data such as the control program and various settings from the memory card 215.

Each of the network controllers 216 and 218 is in charge of exchanging data with an arbitrary device via a network. The network controllers 216 and 218 may employ a general-purpose network protocol such as Ethernet (registered trademark).

The indicator 224 notifies an operating state or the like of the communication unit 200, and is composed of one or a plurality of LEDs arranged on a surface of the unit.

FIG. 3 shows a configuration example in which the required functions are provided by the processor 202 executing programs, but some or all of these provided functions may be implemented using a dedicated hardware circuit (for example, ASIC or FPGA). Alternatively, the main part of the communication unit 200 may be realized by using hardware that follows a general-purpose architecture (for example, an industrial personal computer based on a general-purpose personal computer). In this case, a plurality of OSs having different uses may be executed in parallel by using a virtualization technology, and the required applications may be executed on each OS.

(b3: Safety Unit 300)

Figure 4:
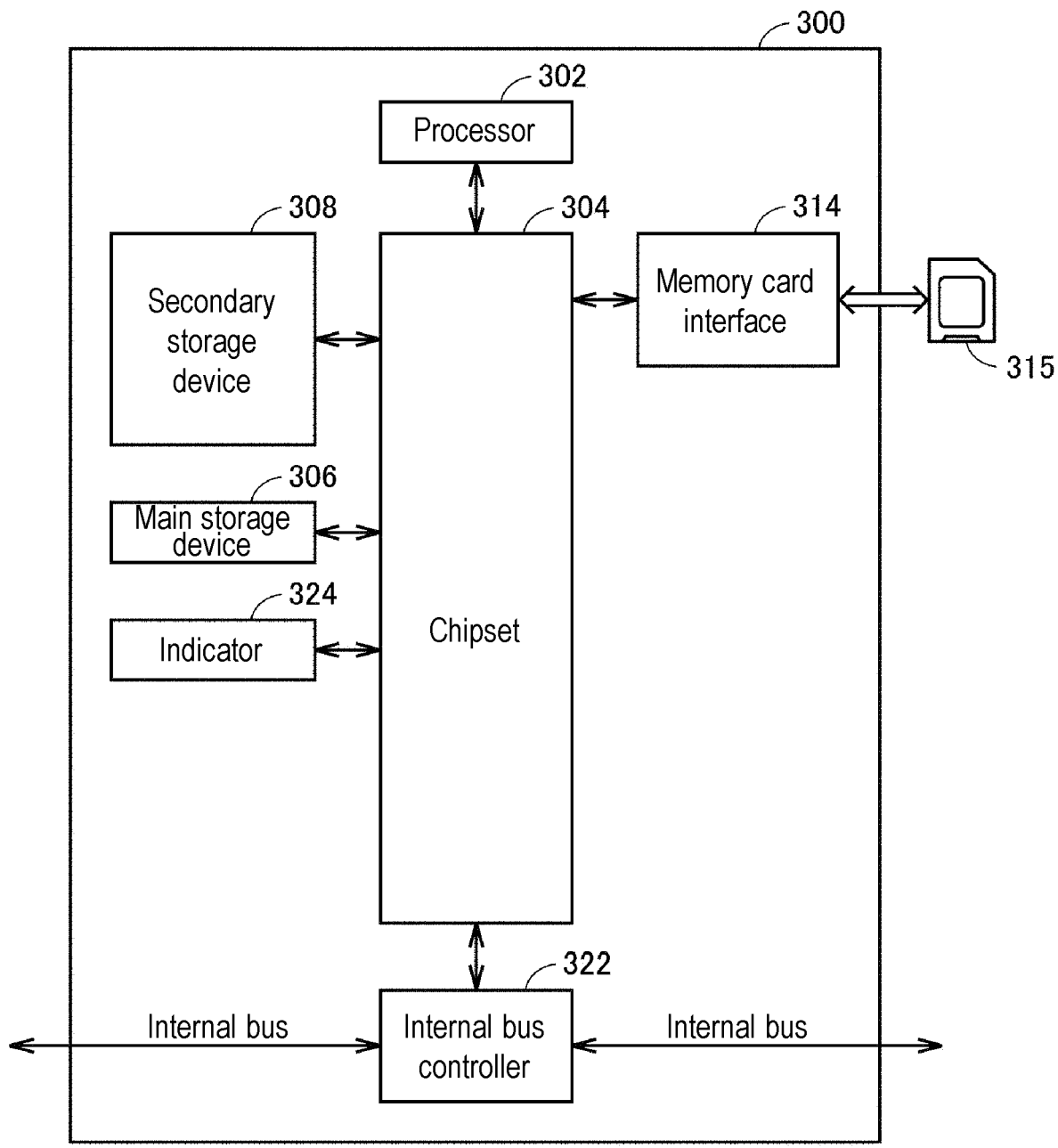
FIG. 4 is a schematic diagram showing a hardware configuration example of a safety unit constituting the control device according to the present embodiment.

FIG. 4 is a schematic diagram showing a hardware configuration example of the safety unit 300 constituting the control device 1 according to the present embodiment. With reference to FIG. 4, the safety unit 300 includes, as main components, a processor 302 such as a CPU and a GPU, a chipset 304, a main storage device 306, a secondary storage device 308, a memory card interface 314, an internal bus controller 322, and an indicator 324.

The processor 302 reads various programs stored in the secondary storage device 308, and expands and executes the programs in the main storage device 306, so as to realize a control operation related to safety control and various processes as described later. The chipset 304 realizes the processing of the safety unit 300 as a whole by mediating the exchange of data between the processor 302 and each component.

In addition to a system program, the secondary storage device 308 stores a safety program that operates in an execution environment provided by the system program.

The memory card interface 314 is configured so that a memory card 315 can be attached thereto and detached therefrom, and is capable of writing data such as the safety program and various settings to the memory card 315 or reading data such as the safety program and various settings from the memory card 315.

The internal bus controller 322 is in charge of exchanging data with the control unit 100 via an internal bus.

The indicator 324 notifies an operating state or the like of the safety unit 300, and is composed of one or a plurality of LEDs arranged on a surface of the unit.

FIG. 4 shows a configuration example in which the required functions are provided by the processor 302 executing the programs, but some or all of these provided functions may be implemented by using a dedicated hardware circuit (for example, ASIC or FPGA). Alternatively, the main part of the safety unit 300 may be realized by using hardware that follows a general-purpose architecture (for example, an industrial personal computer based on a general-purpose personal computer). In this case, a plurality of OSs having different uses may be executed in parallel by using a virtualization technology, and the required applications may be executed on each OS.

C. CONTROL SYSTEM 10

Figure 5:
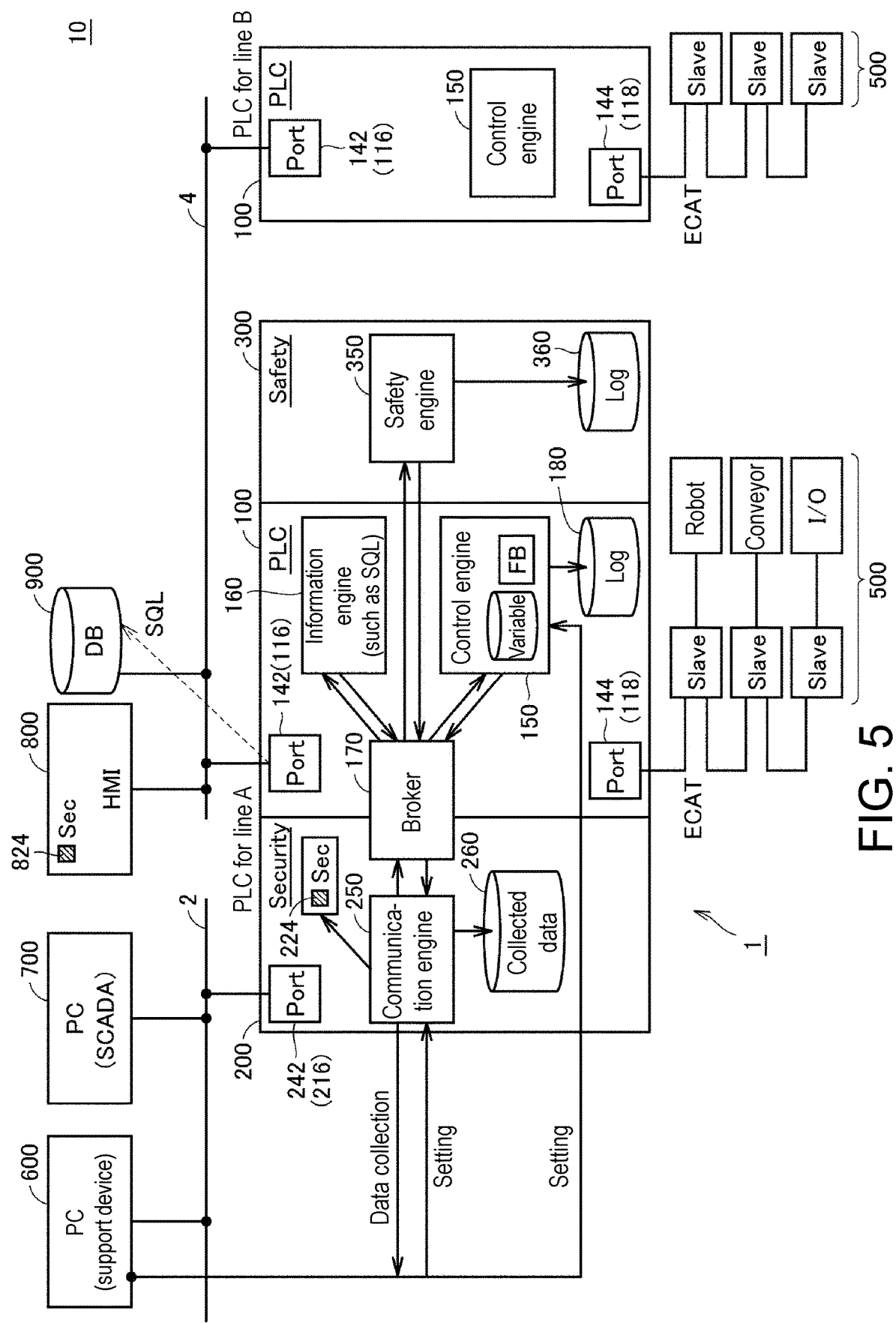
FIG. 5 is a schematic diagram showing a typical example of a control system including the control device 1 according to the present embodiment.

Next, a typical example of a control system 10 including the control device 1 according to the present embodiment will be described. In the following description, a database is referred to as "DB". FIG. 5 is a schematic diagram showing a typical example of the control system 10 including the control device 1 according to the present embodiment.

As an example, the control system 10 shown in FIG. 5 targets two lines (line A and line B) as control targets. Typically, each line is equipped with a conveyor that conveys a workpiece, as well as a robot that is capable of exerting any physical action on the workpiece on the conveyor.

The control unit 100 is arranged in each of the line A and the line B. In addition to the control unit 100 in charge of the line A, the communication unit 200 and the safety unit 300 constitute the control device 1. For convenience of explanation, the description of the function unit 400 and the power supply unit 450 is omitted from FIG. 5.

The communication unit 200 of the control device 1 is connected to a first network 2 via a communication port 242 (network controller 216 in FIG. 3). It is assumed that a support device 600 and an SCADA (Supervision Control And Data Acquisition) device 700 are connected to the first network 2.

The support device 600 is at least capable of accessing the control unit 100, and provides the user with functions such as creating a program to be executed by each unit included in the control device 1, debugging, and setting various parameters. Further, the support device 600 collects information from the communication unit 200 and monitors a communication load of the FA network based on the collected information. Therefore, the support device 600 has a function as a monitoring device.

The SCADA device 700 presents various information obtained by the control operation in the control device 1 to an operator, and generates an internal command or the like for the control device 1 according to the operation from the operator. The SCADA device 700 also has a function of collecting data handled by the control device 1.

The control unit 100 of the control device 1 is connected to a second network 4 via a communication port 142 (network controller 116 in FIG. 2). It is assumed that an HMI (Human Machine Interface) 800 and a database 900 are connected to the second network 4.

The HMI 800 presents various information obtained by the control operation in the control device 1 to the operator, and generates an internal command or the like for the control device 1 according to the operation from the operator. The database 900 collects various data transmitted from the control device 1 (for example, information related to traceability measured from each workpiece).

The control unit 100 of the control device 1 is connected to one or a plurality of field devices 500 via a communication port 144 (network controller 118 in FIG. 2) and the FA network. The field device 500 includes a sensor or a detector that collect various information required for the control operation from the control target, and an actuator that exerts some action on the control target. In the example shown in FIG. 5, the field device 500 includes a robot that exerts some external action on the workpiece, a conveyor that conveys the workpiece, an I/O unit that exchanges a signal with the sensor or actuator arranged in the field, etc.

Similarly, for the control unit 100 in charge of the line B, one or a plurality of field devices 500 are connected via the communication port 144 (network controller 118 in FIG. 2) and the FA network.

Here, when focusing on the functional aspect of the control device 1, the control unit 100 includes a control engine 150, which is a processing execution unit that executes the control operation related to standard control, and an information engine 160 that exchanges data with an external device. The communication unit 200 includes a communication engine 250 for realizing a communication monitoring function as described later. The safety unit 300 includes a safety engine 350 which is a processing execution unit that executes the control operation related to safety control.

Each engine is realized by an arbitrary hardware element such as a processor of each unit or an arbitrary software element such as various programs, or a combination of these elements. Each engine can be implemented in an arbitrary form.

Further, the control device 1 includes a broker 170 that mediates the exchange between the engines. The entity of the broker 170 may be arranged in one or both of the control unit 100 and the communication unit 200.

The control engine 150 holds a variable table and a function block (FB) required for executing the control operation for controlling the control target. Each variable stored in the variable table is periodically collected by the value acquired from the field device 500 by an I/O refresh process, and each value is periodically reflected to the field device 500. A log of the control operation in the control engine 150 may be stored in a log database 180.

The information engine 160 executes an arbitrary information process on the data (variable value held in the variable table) held by the control unit 100. Typically, the information engine 160 includes a process of periodically transmitting the data held by the control unit 100 to a database 900, etc. SQL or the like is used for transmitting such data.

The communication engine 250 monitors target communication data and collects data related to the communication. The monitoring result of the communication engine 250 is stored in a collected data DB 260.

The communication engine 250 notifies by the indicator 224 that some event related to security has occurred, or the level of the security-related event that occurs.

The safety engine 350 corresponds to a detection means that detects whether or not some unauthorized intrusion has occurred in the control device 1. The safety engine 350 acquires and reflects a safety I/O variable required for executing the control operation related to safety control via the control unit 100. A log of the safety control in the safety engine 350 may be stored in a log database 360.

When the communication engine 250 detects some event, for example, the broker 170 changes the operations of the control engine 150, the information engine 160, and the safety engine 350.

D. COUNTERMEASURES AGAINST SECURITY THREAT

The control device 1 according to the present embodiment is capable of detecting any security threat that hinders the normal operation of the equipment or machinery and taking the required measures.

In this specification, "security threat" means any event that prevents the equipment or machinery from operating normally. Here, "normal operation" means a state in which the equipment or machinery can be continuously operated according to the system design and production plan. The concept of "normal operation" also includes ancillary processes such as the start-up, maintenance, setup change, etc. of the equipment or machinery, in order to continue the operation of the equipment or machinery according to the system design and production plan.

All physical ports on the control device have a security risk of being attacked. For example, it is assumed that the control device 1 centered on the PLC is targeted by a DoS attack (Denial of Service attack) or a DDoS attack (Distributed Denial of Service attack). On the other hand, even during the normal operation, access may be concentrated on the control device 1. Therefore, a threshold value (for example, bandwidth) for determining a DoS attack or a DDoS attack can be set based on a setting of the network (for example, bandwidth of the network). When a load exceeding the threshold value occurs, the control unit 100 determines that it is attacked from the outside, and blocks the reception of information. However, other communications are not blocked. As a result, although the control of the control device 1 is restricted, the operation of the control system 10 itself can be continued.

E. ISSUE RELATED TO MONITORING OF FA NETWORK

In order to detect threats such as a DoS attack or a DDoS attack, it is desirable to monitor the FA network. However, the following issue is envisioned regarding the monitoring of the FA network.

First, in the FA network, a wide variety of communications are performed according to the field devices 500 (production devices). It is not easy to set a standard for determining the normality or abnormality of such communication.

Furthermore, there is a possibility that the user's interest is not directed to the mechanism for realizing data communication such as the communication protocol. For example, the user understands at the application level that it is desirable to realize the frequency (or cycle) of data synchronization between the control units 100 (PLCs), the data exchange between the control unit 100 and the remote IO unit, the display on the HMI 800, etc. by the control system 10. However, the user is often not interested in the details of communication for realizing these (for example, the details of communication protocol). Therefore, it is assumed that the user has little interest in how the communication on the FA network is like, or the user does not want to manage the communication.

Furthermore, at the manufacturing site, there are many engineers who are familiar with production technology, but there are few engineers who are familiar with network technology. In such a situation, since there are few engineers who are familiar with network security, it becomes more difficult to monitor the status of the FA network.

F. HARDWARE CONFIGURATION OF SETTING DEVICE

Next, an example of a user interface for monitoring the FA network in the control system 10 as described above will be described. The support device 600 shown in FIG. 5 functions as the setting device for the monitoring system that monitors communication related to the FA network.

Figure 6:
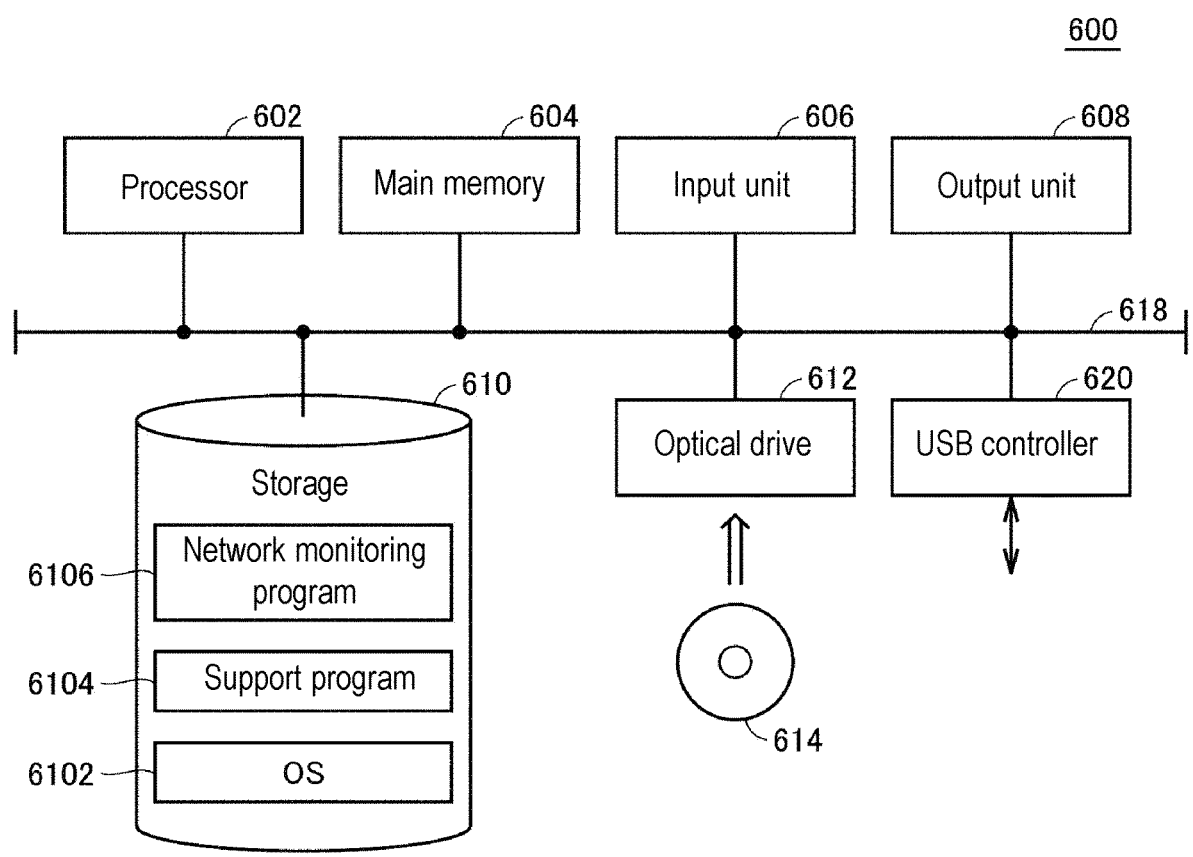
FIG. 6 is a schematic diagram showing a hardware configuration example of a support device connected to the control device 1 according to the present embodiment.

FIG. 6 is a schematic diagram showing a hardware configuration example of the support device 600 connected to the control device 1 according to the present embodiment. As an example, the support device 600 is realized by using hardware (for example, a general-purpose personal computer) that follows a general-purpose architecture.

With reference to FIG. 6, the support device 600 includes a processor 602, a main memory 604, an input unit 606, an output unit 608, a storage 610, an optical drive 612, and a USB controller 620. These components are connected via a processor bus 618.

The processor 602 is composed of a CPU, a GPU, etc., and reads programs (an OS 6102 and a support program 6104 as an example) stored in the storage 610 and expands and executes the programs in the main memory 604, so as to realize a setting process for the control device 1.

The main memory 604 is composed of a volatile storage device such as a DRAM and an SRAM. The storage 610 is composed of, for example, a non-volatile storage device such as an HDD and an SSD.

In addition to the OS 6102 for realizing the basic functions, the storage 610 stores the support program 6104 for providing the function as the support device 600, and a network monitoring program 6106 for providing the function as the setting device for the monitoring system. That is, with the network monitoring program 6106 executed by the processor 602, the support device 600 realizes the setting device for the monitoring system according to the present embodiment.

The input unit 606 is composed of a keyboard, a mouse, etc., and receives a user operation. The output unit 608 is composed of a display, various indicators, a printer, etc., and outputs the processing result from the processor 602.

The USB controller 620 exchanges data with the control device 1, etc. via USB connection.

The support device 600 has the optical drive 612, and the programs stored in a recording medium 614 that non-transiently stores computer-readable programs (for example, an optical recording medium such as a DVD (Digital Versatile Disc)) are read therefrom and installed in the storage 610, etc.

The support program 6104 and the network monitoring program 6106 executed by the support device 600 may be installed via the computer-readable recording medium 614, or may be downloaded from a server device on the network to be installed. Further, the functions provided by the support device 600 according to the present embodiment may be realized by using a part of a module provided by the OS.

FIG. 6 shows a configuration example in which the processor 602 executes the programs to provide the functions required as the support device 600, but some or all of these provided functions may be implemented by using a dedicated hardware circuit (for example, ASIC or FPGA).

G. CONFIGURATION OF MONITORING SYSTEM

Figure 7:
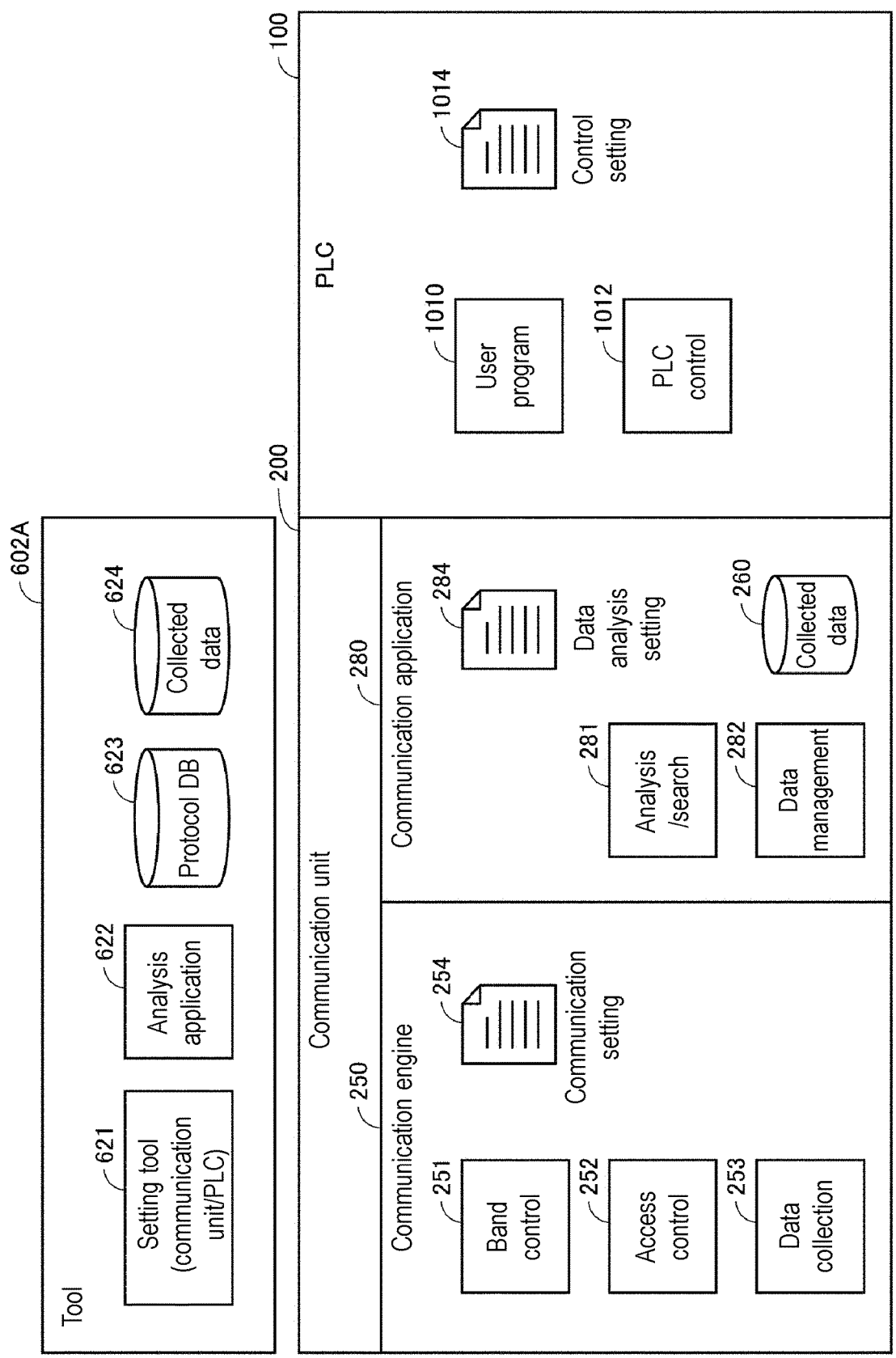
FIG. 7 is a diagram showing a schematic configuration of a monitoring system according to the present embodiment.

FIG. 7 is a diagram showing a schematic configuration of the monitoring system according to the present embodiment. As shown in FIG. 7, the monitoring system includes a tool 602A (monitoring setting tool), the communication unit 200, and the control unit 100. The tool 602A is implemented in the support device 600 (see FIG. 6) by the processor 602 executing the network monitoring program 6106.

The tool 602A has a setting tool 621, an analysis application 622, a protocol DB 623, and a collected data DB 624. The setting tool 621 sets the data collected from the communication unit 200 and the control unit 100 (PLC). The analysis application 622 executes a process of associating the collected data with the setting information. The protocol DB 623 accumulates information related to the communication protocol.

The communication unit 200 has a communication engine 250 and a communication application 280. The communication engine 250 includes a band control module 251, an access control module 252, a data collection module 253, and communication setting information 254. The band control module 251 and the access control module 252 control the communication band and access to the control unit 100, so as to protect the control unit 100 from a DoS attack or a DDoS attack. The data collection module 253 collects communication data to be monitored. The communication setting information 254 is information set in the communication engine 250 by the tool 602A.

The communication application 280 is implemented in the communication unit 200. The communication application 280 includes an analysis and search module 281, a data management module 282, a collected data DB 260, and data analysis setting information 284. The analysis and search module 281 analyzes the communication amount in the target communication. The data management module 282 receives data from the data collection module 253 with respect to the communication to be monitored, and accumulates the data in the collected data DB 260. The data analysis setting information 284 is information set in the communication engine 250 by the tool 602A.

The control unit 100 has a user program 1010, a PLC control module 1012, and control setting information 1014. The user program 1010 is a program created by the user, and is provided to the control unit 100 by the support device 600. The PLC control module 1012 controls the operation of the control unit 100 according to the user program 1010 and the control setting information 1014.

The monitoring setting tool, the communication unit 200, and the control unit 100 constitute the monitoring system that monitors communication related to the FA network. The data collection module 253, the data management module 282, and the collected data DBs 260 and 624 constitute the data collection unit that collects data indicating the status of communication on the FA network. The analysis application 622 constitutes the data analysis unit that analyzes the collected data according to pre-registered information related to the setting of the communication on the FA network, and generates the monitoring setting information for monitoring the communication. The band control module 251, the access control module 252, the PLC control module 1012, and the user program 1010 realize the monitoring unit that monitors the communication to be monitored according to the monitoring setting information.

H. PHASE OF NETWORK MONITORING

Figure 8:
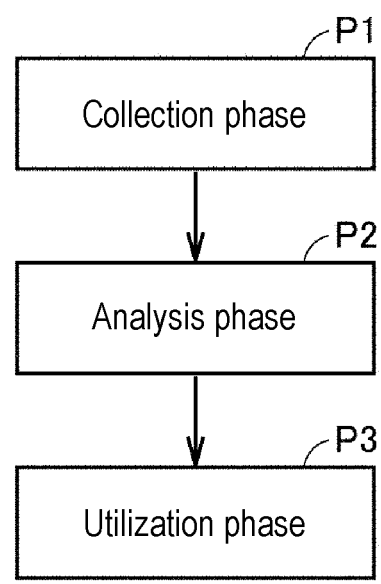
FIG. 8 is a schematic diagram showing a scenario for realizing monitoring of a communication load of an FA network with the configuration shown in FIG. 7.

FIG. 8 is a schematic diagram showing a scenario for realizing monitoring of a communication load of the FA network with the configuration shown in FIG. 7. As shown in FIG. 8, the monitoring of the communication load of the network performed by the monitoring system is realized by three phases, which are a collection phase P1, an analysis phase P2, and a utilization phase P3. The term "phase" may be replaced with "step".

(h1. Collection Phase)

Figure 9:
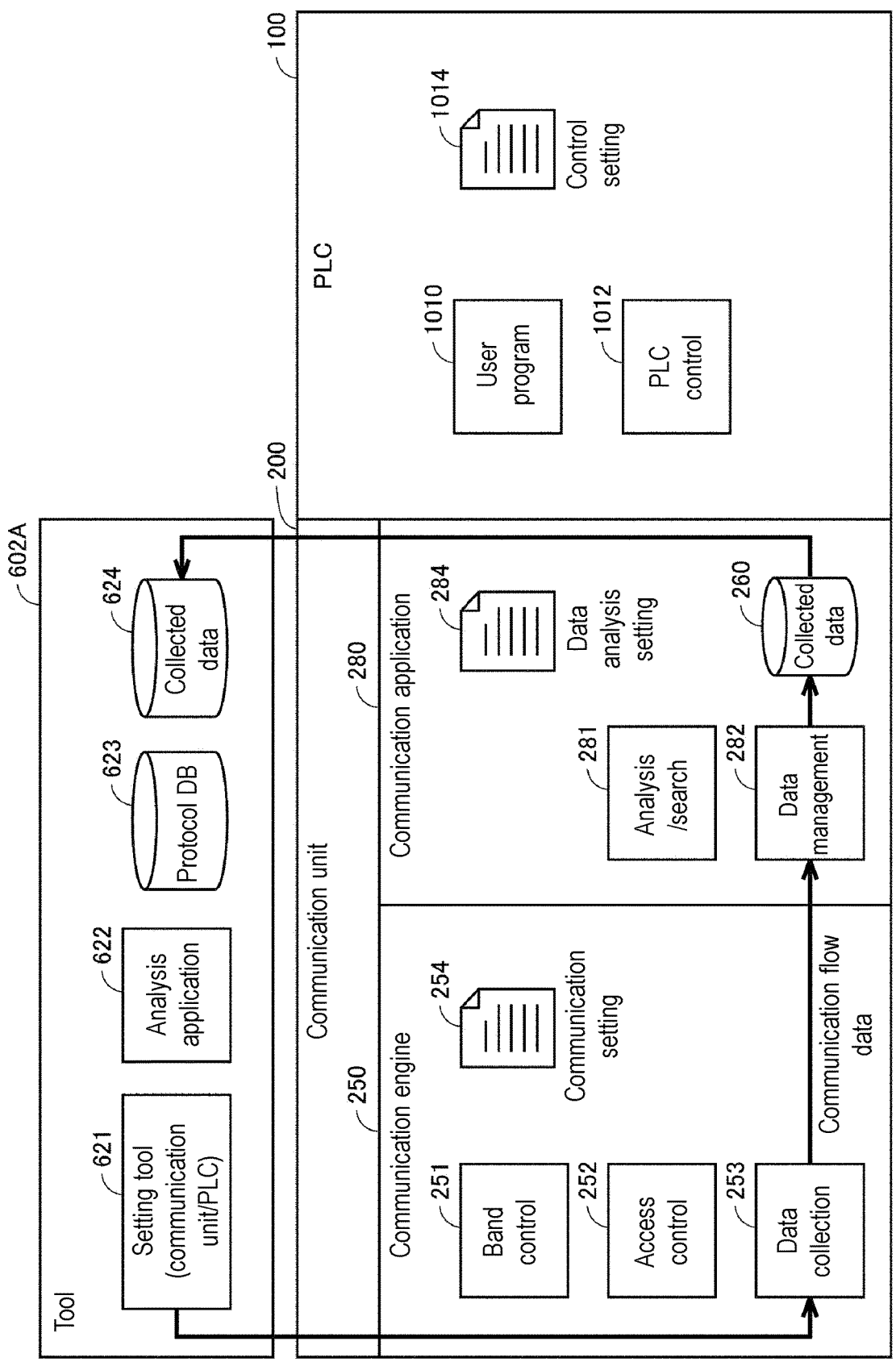
FIG. 9 is a diagram illustrating an outline of a collection phase shown in FIG. 8.

FIG. 9 is a diagram illustrating an outline of the collection phase shown in FIG. 8. As shown in FIG. 9, the setting tool 621 executes the setting related to data collection. The setting tool 621 sends information indicating a setting content to the data collection module 253. The data collection module 253 collects the communication data according to the setting content. The data collection module 253 sends the collected communication flow data to the data management module 282.

The data management module 282 stores the collected data in the collected data DB 260. The data collection module 253 may store the data in the collected data DB 260.

The data stored in the collected data DB 260 is transferred to the collected data DB 624 of the monitoring setting tool. In order to prevent the data transfer from becoming a communication load, it is preferable to transfer the data to the collected data DB 624 when or after the collection phase P1 is completed.

(h2. Analysis Phase)

Figure 10:
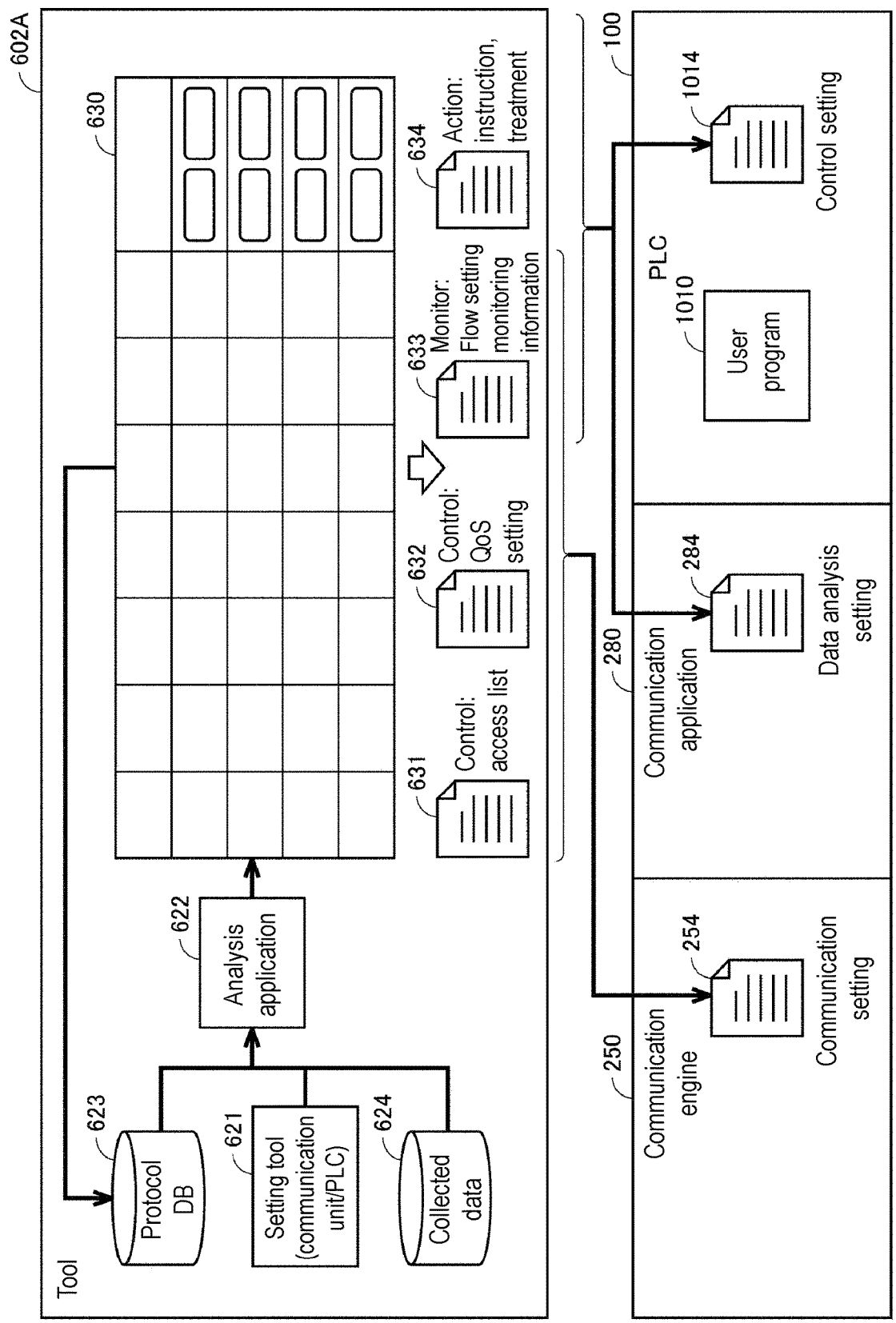
FIG. 10 is a diagram illustrating an outline of an analysis phase.

FIG. 10 is a diagram illustrating an outline of the analysis phase. With reference to FIG. 10, the analysis application 622 receives communication data from the collected data DB 624, setting information from the setting tool 621, and protocol information from the protocol DB 623. The "setting information" and the "protocol information" are pre-registered information related to the setting of the communication.

The analysis application 622 generates actual communication information by associating the setting information, the collected data, and the protocol information, and displays the actual communication information on a user interface screen 630. As a result, the user can easily grasp the current status of communication of the control system 10. In addition, it is possible to provide the user with assistance in setting related to security. The user interface screen 630 is displayed on the support device 600. However, the user interface screen 630 may be displayed on the HMI 800.

Further, the user can generate access list information 631, QoS (Quality of Service) setting information 632, flow setting monitoring information 633, and instruction and treatment information 634 by inputting to the user interface screen 630. The access list information 631, the QoS setting information 632, the flow setting monitoring information 633, and the instruction and treatment information 634 correspond to the monitoring setting information. The flow setting monitoring information 633 includes a threshold value of the bandwidth of the communication to be monitored. Therefore, the monitoring setting information includes the threshold value of the bandwidth of the communication to be monitored.

The access list information 631, the QoS setting information 632, and the flow setting monitoring information 633 are sent to the communication engine 250. The communication engine 250 generates or updates the communication setting information 254 based on the access list information 631, the QoS setting information 632, and the flow setting monitoring information 633.

The flow setting monitoring information 633 is sent to the control unit 100 together with the instruction and treatment information 634. The control unit 100 creates or updates the control setting information 1014 used for executing the user program 1010 based on the flow setting monitoring information 633 and the instruction and treatment information 634. Therefore, the communication setting information 254 and the control setting information 1014 correspond to the monitoring setting information. The monitoring unit (communication engine 250 or control unit 100) can output a notification to the user when the bandwidth exceeds the threshold value. That is, when there is a DoS attack or a DDoS attack on the control device 1, the control device 1 can issue a warning.

FIG. 11 is a diagram showing an embodiment of the user interface screen 630 shown in FIG. 10. With reference to FIG. 11, the user interface screen 630 has columns 641 to 651. Each of the records R1 to R4 is actual communication information composed of the information stored in each of the columns 641 to 651. Each of the columns 641 to 651 will be described hereinafter.

Information related to a transmission source is stored in the columns 641 and 642. Specifically, the device name of the transmission source is stored in the column 641. The IP address of the device of the transmission source is stored in the column 642.

Information related to a transmission destination is stored in the columns 643 and 644. Specifically, the device name of the transmission destination is stored in the column 643. The IP address of the device of the transmission destination is stored in the column 644.

The name of the manufacturer of the transmission source device is stored in the column 645. The MAC (Media Access Control) address of the device of the transmission source is stored in the column 646.

Information of the protocol for communication between the transmission source and the transmission destination is stored in the column 647. The transport layer protocol (TCP (Transmission Control Protocol) or UDP (User Datagram Protocol)) and the port number are stored in the column 648.

Information related to the content of communication between the transmission source and the transmission destination is stored in the column 649. Information of the actual communication band is stored in the column 650. The column 651 is a column for setting an action related to communication, and a rejection button 652 and a monitoring button 653 are arranged for each of the records R1 to R4. The rejection button 652 and the monitoring button 653 receive input of the user for selecting options of the action for communication between the transmission source and the transmission destination. The options of the action include monitoring communication between the transmission source and the transmission destination and rejecting communication between the transmission source and the transmission destination. The options of the action are not limited to these options. The user can take measures related to security based on the result of data collection. For example, the communication of the control device 1 can be set so that the control device 1 rejects the communication that seems to be apparently abnormal.

The user can directly input the actual communication information to the tool by using the user interface screen 630. The information edited by the user is sent to the collected data DB 624, the setting tool 621, and the protocol DB 623 for feedback.

For example, known communication of a known device is monitored based on flow rate. In the case of unknown communication of a known device or known communication of an unknown device, band control by QoS is set to be executed. In the case of unknown communication of an unknown device, the communication is rejected by access control. Thus, it is possible to monitor security according to the user's request. Specifically, it is possible to detect an attack spoofing a known device. Alternatively, it is possible to reject an attack from an unknown device. On the other hand, it is also possible to allow maintenance of an unknown device (but limit the flow rate).

In the present embodiment, not only the IP address but also the device name is registered in the monitoring setting tool as information for specifying each of the transmission source and the transmission destination. In addition, the specific communication content is registered in the monitoring setting tool. Therefore, the user can easily grasp the current status of the communication load of the control system. Furthermore, the monitoring setting tool can assist in the user setting of security.

Figure 12:
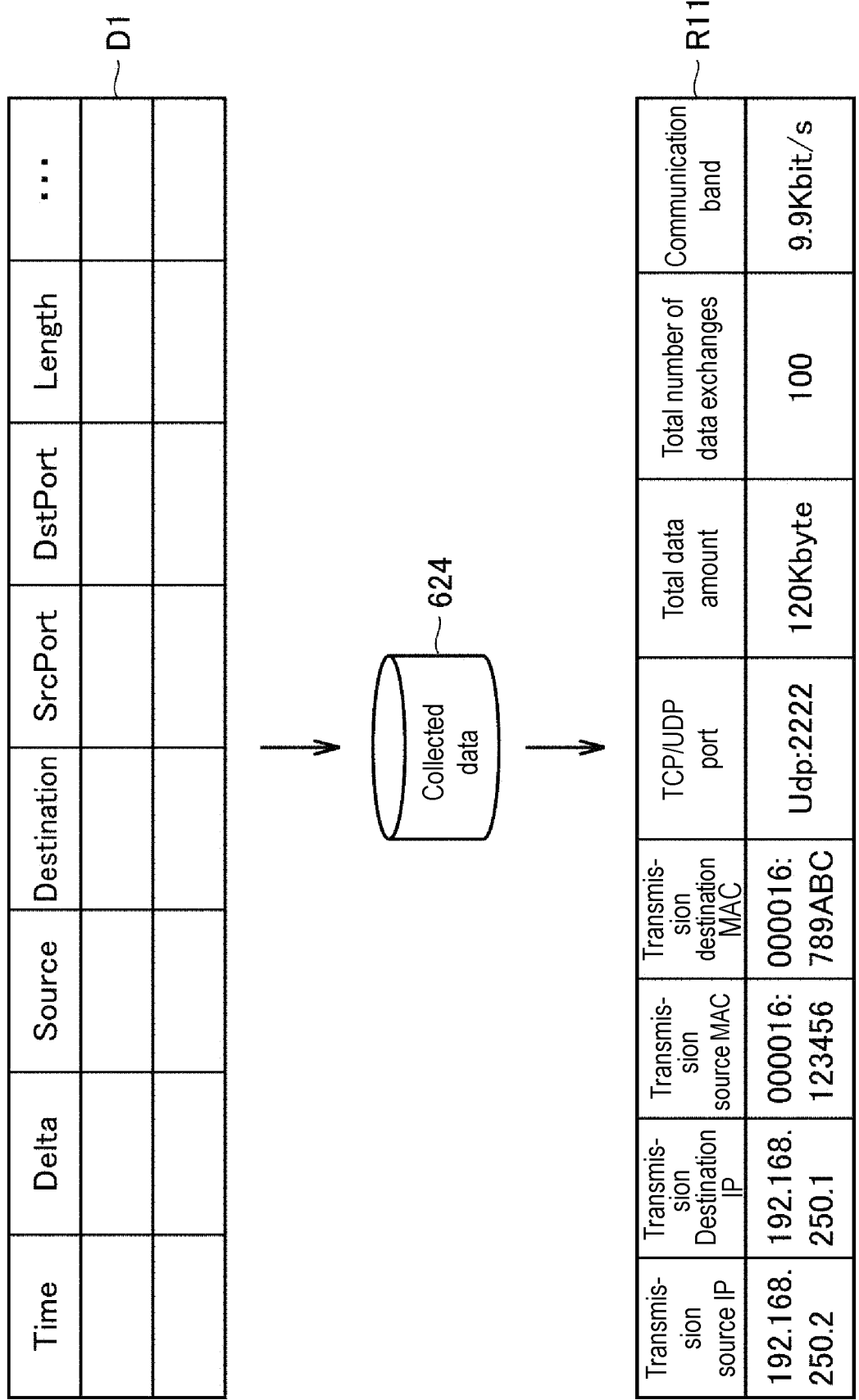
FIG. 12 is a schematic diagram illustrating a data collection process for displaying the user interface screen shown in FIG. 11.

FIG. 12 is a schematic diagram illustrating a data collection process for displaying the user interface screen 630 shown in FIG. 11. With reference to FIG. 12, communication data D1 is stored in the collected data DB 624.

As an example, the communication data D1 includes, but not limited to, items "Time", "Delta", "Source", "Destination", "SrcPort", "DstPort", "Length", etc. The item "Time" stores the transmission time of the data. The item "Delta" stores the difference between the previous transmission time and the current transmission time. The item "Source" stores the IP address representing the transmission source. The item "Destination" stores the IP address representing the transmission destination. The item "SrcPort" stores the port of the transmission source. The item "DstPort" stores the port of the transmission destination. The item "Length" stores the length of the data.

In the present embodiment, information related to the frequency of data exchange between two devices is generated for each collection unit time and stored in the collected data DB 624 as a communication record. In the communication data D1, the two devices that exchange data are specified by the IP addresses corresponding to the items "Source" and "Destination". The communication record R11 stores the IP address of the transmission source, the IP address of the transmission destination, the MAC address of the transmission source, the MAC address of the transmission destination, the port, the total amount of communication data (total data amount), the total number of data exchanges, and the communication band.

The frequency of storing the communication record in the collected data DB 624 is not particularly limited, and is, for example, one record per second. The frequency of storing the record in the collected data DB 624 may be set by the user.

Figure 13:
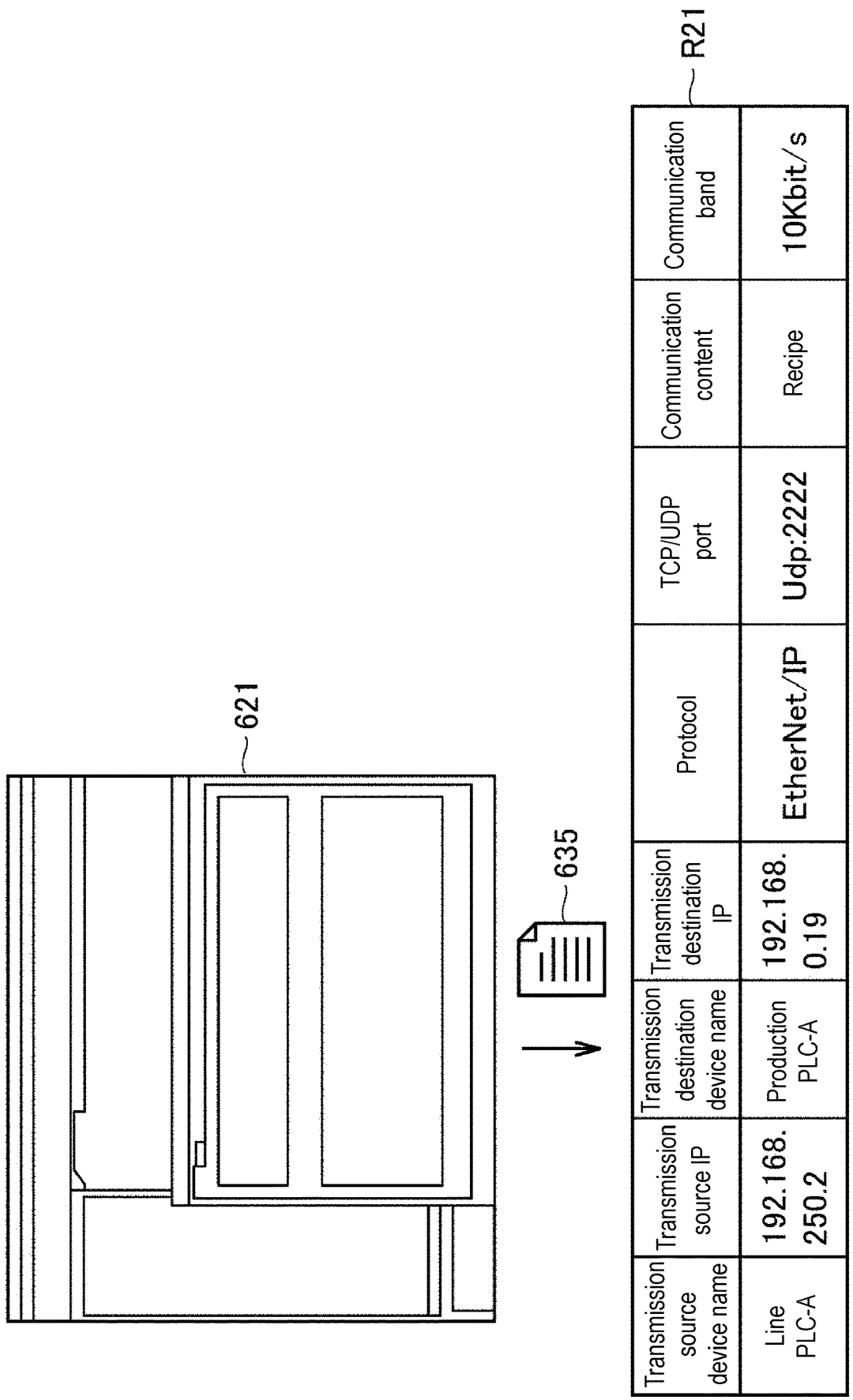
FIG. 13 is a schematic diagram illustrating a setting process for displaying the user interface screen shown in FIG. 11.

FIG. 13 is a schematic diagram illustrating a setting process for displaying the user interface screen 630 shown in FIG. 11. With reference to FIG. 13, the user inputs information such as the device name and IP address of each of the two nodes (transmission source and transmission destination), the type of information exchanged between the two nodes, and the frequency of data exchange from the interface screen of the setting tool 621. The information input to the setting tool 621 is exported from the setting tool 621 to generate setting tool data 635. The setting tool data 635 includes a plurality of setting records R21. The setting tool data 635 is the setting information from the setting tool 621, and is included in the "pre-registered information". The setting record R21 stores the device name of the transmission source, the IP address of the transmission source, the device name of the transmission destination, the IP address of the transmission destination, the protocol, the port, the communication content, and the communication band.

Figure 14:
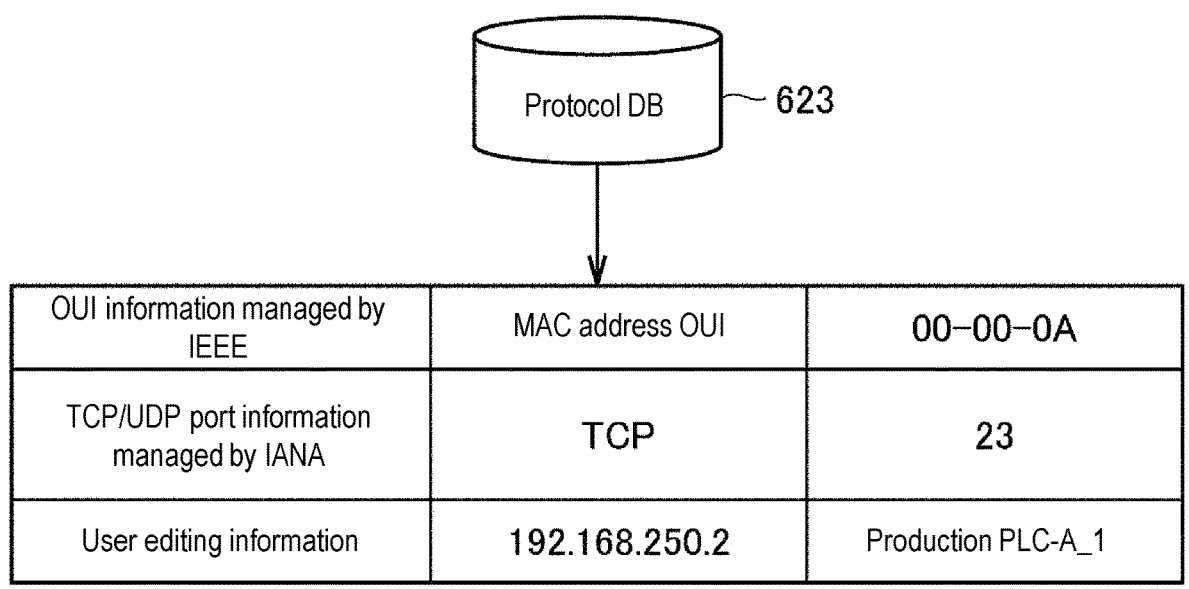
FIG. 14 is a schematic diagram illustrating an extraction process of static data for displaying the user interface screen shown in FIG. 11.

FIG. 14 is a schematic diagram illustrating an extraction process of static data for displaying the user interface screen 630 shown in FIG. 11. With reference to FIG. 14, from the protocol DB 623, OUI (Organizationally Unique Identifier) information managed by IEEE, TCP/UDP port information managed by IANA (Internet Assigned Number Authority), and user editing information are extracted as protocol information. The user editing information is, for example, the IP address of the device and the name of the device. The information is included in the "pre-registered information".

The analysis application 622 associates the communication record with the setting record and the static data to convert the communication record into a display record that is easy for the user to understand (see records R1 to R4 shown in FIG. 11), and displays the display record on the user interface screen 630.

(h3. Action Setting)

Figure 15:
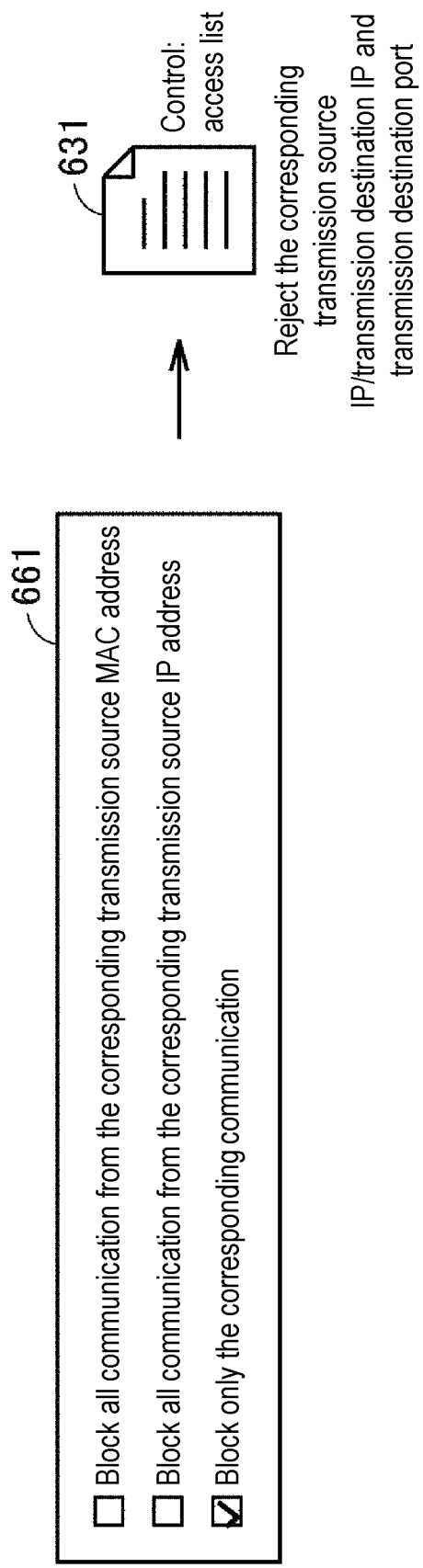
FIG. 15 is a diagram for illustrating a setting of an action for communication rejection.

FIG. 15 is a diagram for illustrating a setting of an action for communication rejection. When the user selects the rejection button 652 shown in FIG. 11, the interface screen 661 is displayed on the support device 600. On the interface screen 661, a plurality of options for rejecting access to the control device 1 from the transmission destination are displayed in the form of check boxes. In FIG. 15, three options which are "block all communication from the corresponding transmission source MAC address", "block all communication from the corresponding transmission source IP address", and "block only the corresponding communication" are shown.

When the user selects one of the three options, the access list information 631 including the content of the option is generated. The access list information 631 is information indicating the rejection of communication of the corresponding transmission source IP/transmission destination IP and transmission destination port.

Figure 16:
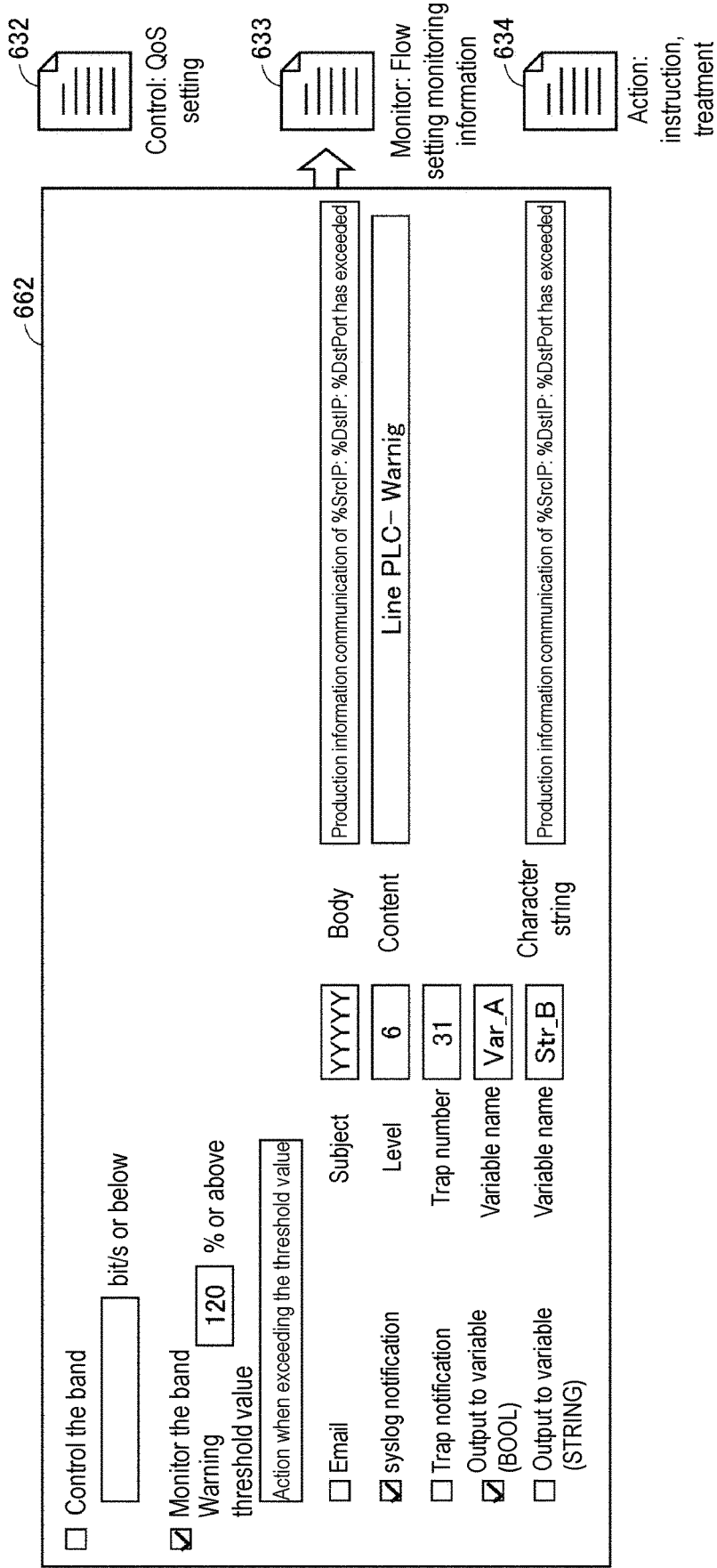
FIG. 16 is a diagram for illustrating a setting of an action for communication monitoring.

FIG. 16 is a diagram for illustrating a setting of an action for communication monitoring. When the user selects the monitoring button 653 shown in FIG. 11, the interface screen 662 is displayed on the support device 600.

The interface screen 662 displays two options which are "control the band" and "monitor the band". When selecting the option "control the band", the user inputs a bandwidth value (unit: bit/s) in the input box.

On the other hand, when selecting the option "monitor the band", the user sets a bandwidth threshold value (120% of the normal bandwidth in the example shown in FIG. 16) for generating a warning from the tool. In addition, the user can select one or a plurality of actions when the threshold value is exceeded from a plurality of options. When selecting the option "Email", the user can set the subject and the body.

When selecting the option "syslog notification", a syslog message for an IT server is created. The user can set the monitoring level (level 6 in the example of FIG. 16) and the notification content included in the syslog message.

When selecting the option "Trap notification", the user can set the Trap number. In addition, the user can select to store the monitoring result of the tool in a variable. The type of the variable can be selected from Boolean type and STRING type.

In the case where the user selects to output a Boolean variable, the value of the variable Var_A becomes true when the bandwidth exceeds the threshold value. Therefore, the action can be described by the PLC program. FIG. 17 is a diagram showing an example of a part of the PLC program. The function is executed when the value of Var_A is True.

On the other hand, in the case where the user selects to output a STRING variable, the character string preset by the user is stored in the variable Str_B when the bandwidth exceeds the threshold value. The character string stored in the variable Str_B is displayed as a message on the support device 600.

Settings other than the record unit settings, such as the address of the Email destination when the user selects the option "Email", the address of the syslog server when the option "syslog" is set, and the Trap transmission destination when the option "Trap" is selected, may be set separately as common settings.

(h4. Utilization Phase)

Figure 18:
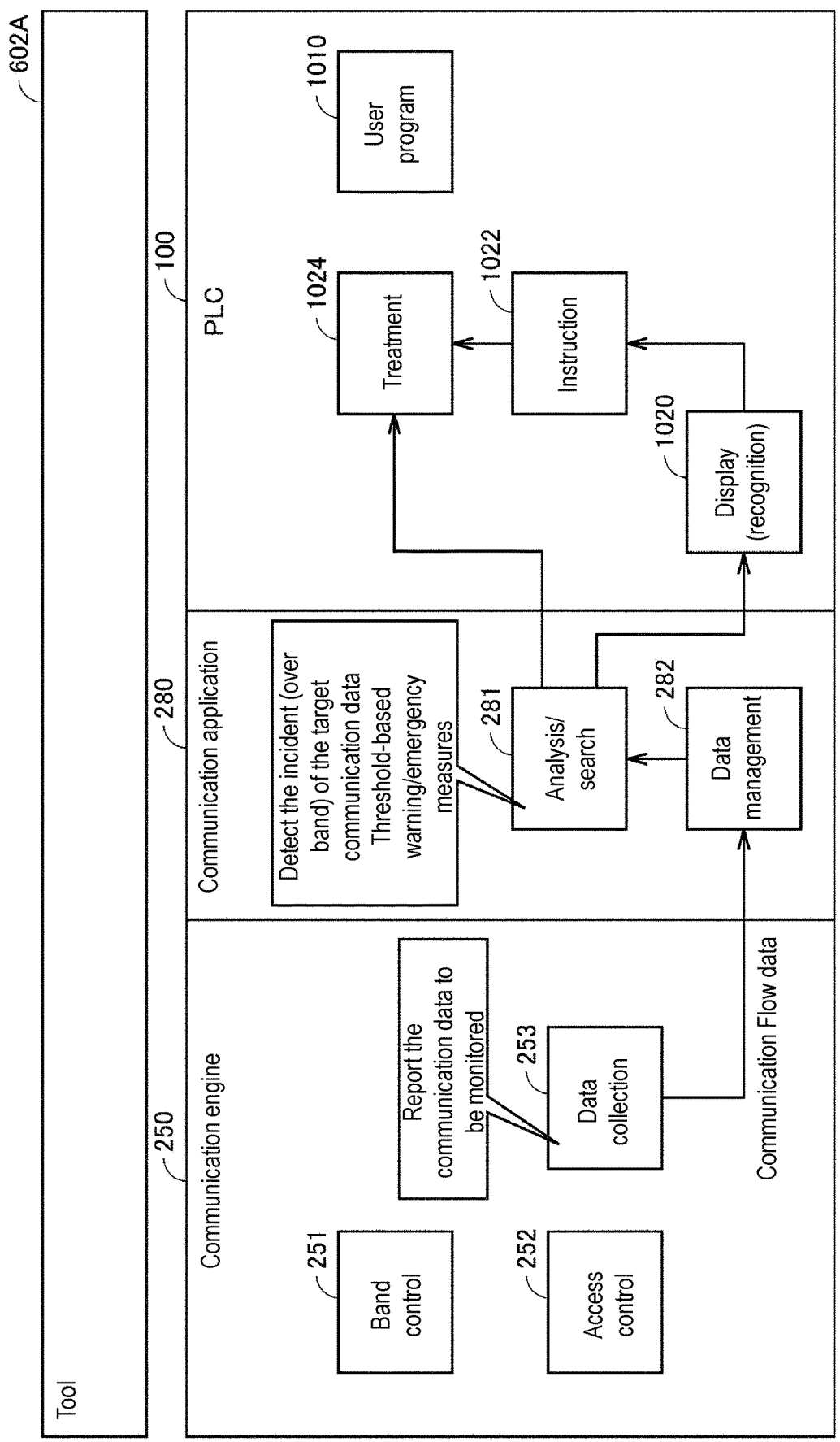
FIG. 18 is a diagram illustrating an outline of a utilization phase.

FIG. 18 is a diagram illustrating an outline of the utilization phase. As shown in FIG. 18, the monitoring setting tool is not required in the utilization phase. In the communication engine 250, the data collection module 253 monitors the communication data to be monitored according to the setting content, and sends the communication flow data which is the monitoring result to the data management module 282. The data management module 282 sends the collected data to the analysis and search module 281.

For example, the analysis and search module 281 determines whether the bandwidth of the target communication data exceeds the threshold value. When the bandwidth exceeds the threshold value, the analysis and search module 281 detects an incident. For example, the analysis and search module 281 detects the incident when detecting data that is not related to production information. Alternatively, the analysis and search module 281 detects abnormality in the data of the production information (such as a spoofing attack). In these cases, the control unit 100 executes a process according to the level of the incident. For example, when the level of the incident is a warning level to the user, the analysis and search module 281 instructs the display module 1020 to display the warning. The display module 1020 executes some or all of the processes listed below, for example.

(A1) Turn on the device variable.
(A2) Display the event log.
(A3) Turn on the indicator (LED).
(A4) Send an Email including a warning message.
(A5) Display a message on the display device (for example, support device 600, HMI 800, etc.).

The instruction module 1022 executes the process according to the instruction from the display module 1020, for example, the operation of a display or a tool.

The treatment module 1024 executes a preset process according to the instruction from the instruction module 1022 or the instruction from the analysis and search module 281. The preset process includes, for example, some or all of the processes listed below.

(B1) Discontinue production due to execution suspension of the program.
(B2) Concealment of information by clearing the stored content of the memory.
(B3) Block the communication, making it impossible to change from the host system.
(B4) Save the production information in a local location.

As described above, according to the present embodiment, it is possible to monitor the communication in the FA network and set for the monitoring. In particular, according to the present embodiment, the status of the communication load can be shown to the user. For example, the user can set the monitoring system to issue a warning when the bandwidth exceeds the threshold value. Therefore, the user can set to monitor the load in the network without a high level of expertise. According to the present embodiment, it is possible to assist the user in setting the security of the FA network.

I. APPENDIX

As described above, the present embodiment includes the following disclosures.

1. A monitoring system monitoring communication related to an FA network, the monitoring system including:
a data collection unit (253, 282, 260, 624) collecting data indicating a status of communication on the FA network;
a data analysis unit (622) analyzing the data collected according to pre-registered information related to a setting of the communication on the FA network, and generating monitoring setting information for monitoring the communication (631, 632, 633, 634); and
a monitoring unit (251, 252, 1012, 1010) monitoring communication to be monitored according to the monitoring setting information (631, 632, 633, 634).

2. The monitoring system according to configuration 1, wherein the monitoring setting information (631, 632, 633, 634) includes a threshold value of a bandwidth of the communication to be monitored, and
the monitoring unit (251, 252, 1012, 1010) outputs a notification to a user when the bandwidth exceeds the threshold value.

3. The monitoring system according to configuration 1 or 2, further including a display unit (600, 800),
wherein the data includes an address of a transmission source, an address of a transmission destination, a frequency of data exchange, and a total amount of communication data,
the pre-registered information includes a name of the transmission source, a name of the transmission destination, and a name indicating communication between the transmission source and the transmission destination, and
the data analysis unit (622) generates actual communication information (R1 to R4) in which the data is associated with the pre-registered information, and displays the actual communication information (R1 to R4) on the display unit (600, 800).

4. The monitoring system according to configuration 3, wherein the data analysis unit (622) is configured to receive input of a user for selecting options of an action for the communication between the transmission source and the transmission destination, and generate the monitoring setting information (631, 632, 633, 634), and
the options of the action include:
monitoring of the communication between the transmission source and the transmission destination (653), and
rejection of the communication between the transmission source and the transmission destination (652).

5. The monitoring system according to any one of configurations 1 to 4, wherein the monitoring unit (251, 252, 1012, 1010) is included in a control device (1) connected to the FA network.

6. A setting device (600) for a monitoring system monitoring communication related to an FA network,
wherein the monitoring system includes a monitoring unit (251, 252, 1012, 1010) that monitors the communication according to monitoring setting information (631, 632, 633, 634), and the setting device (600) includes:
a data collection unit (624) collecting data indicating a status of communication on the FA network; and
a data analysis unit (622) analyzing the data collected according to pre-registered information related to a setting of the communication on the FA network, and generating the monitoring setting information (631, 632, 633, 634) for monitoring the communication.

7. A monitoring method of a monitoring system monitoring communication related to an FA network, the monitoring method including:
a step in which a data collection unit (253, 282, 260, 624) of the monitoring system collects data indicating a status of communication on the FA network (P1);
a step in which a data analysis unit (622) of the monitoring system analyzes the data collected according to pre-registered information related to a setting of the communication on the FA network, and generates monitoring setting information (631, 632, 633, 634) for monitoring the communication (P2); and a step in which a monitoring unit (251, 252, 1012, 1010) of the monitoring system monitors communication to be monitored according to the monitoring setting information (631, 632, 633, 634) (P3).

It should be considered that the embodiments disclosed herein are exemplary in all respects and not restrictive. The scope of the invention is shown by the claims rather than the above description, and it is intended that all modifications within the meaning and scope equivalent to the claims are included.

What is claimed is:

1. A monitoring system monitoring communication related to an FA network, the monitoring system comprising:
   a first processor of a control device coupled to and controlling a plurality of production devices in the FA network via a second network, a second processor coupled to the first processor, and a third processor communicatively coupled to the second processor via a first network different from the second network, and the first processor communicating to the third processor through the first network and the second processor, wherein
   the second processor and the third processor are configured to collect data indicating a status of communication on the FA network;
   the third processor is configured to receive the collected data analyze the data collected according to pre-registered information related to a setting of the communication on the FA network, and generate monitoring setting information for monitoring the communication, wherein the monitoring setting information includes a threshold value of a bandwidth, protocol and communication content for each of the plurality of production devices connected to the first processor, and at least two of the production devices are communicated with the first processor with different communication protocols having different threshold value of the bandwidth and different communication contents; and
   the first processor and the second processor are configured to monitor communication to be monitored according to the monitoring setting information, and detect an attack on the FA network by determining a flow rate of communication exceeding the threshold value of the bandwidth corresponding to the communication protocol of each production device to which the communication is directed,
   in response to the detection of the attack on the FA network, the second processor is further configured to limit the flow rate of the communication according to a user-specified bandwidth value, and the first processor is further configured to output a notification to a user when the bandwidth exceeds the threshold value as to inform the user of the attack on the FA network based on the monitor setting information generated by the third processor.

2. The monitoring system according to claim 1, further comprising a display device,
   wherein the data comprises an address of a transmission source, an address of a transmission destination, a frequency of data exchange, and a total amount of communication data,
   the pre-registered information comprises a name of the transmission source, a name of the transmission destination, and a name indicating communication between the transmission source and the transmission destination, and
   the third processor is configured to generate actual communication information in which the data is associated with the pre-registered information, and displays the actual communication information on the display device.

3. The monitoring system according to claim 2, wherein the third processor is configured to receive input of a user for selecting options of an action for the communication between the transmission source and the transmission destination, and generate the monitoring setting information, and
   the options of the action comprise:
   monitoring of the communication between the transmission source and the transmission destination, and
   rejection of the communication between the transmission source and the transmission destination.

4. The monitoring system according to claim 1, wherein the first processor and the second processor are included in a control device connected to the FA network.

5. A setting device for a monitoring system monitoring communication related to an FA network,
   wherein the monitoring system comprises a first processor of a control device coupled to and controlling a plurality of production devices in the FA network via a second network and a second processor coupled to the first processor and configured to monitor the communication according to monitoring setting information, and detect an attack on the FA network when a flow rate of communication exceeds a threshold value of a bandwidth of the communication, and
   the setting device comprises a third processor communicatively coupled to the second processor via a first network different from the second network, and configured to:
   collect data indicating a status of communication on the FA network through the second processor and the first network; and
   receive and analyze the data collected according to pre-registered information related to a setting of the communication on the FA network, and generate the monitoring setting information for monitoring the communication, the monitoring setting information comprises the threshold value of the bandwidth, a communication protocol and communication content for each of the plurality of production devices connected to the first processor, and at least two of the production devices are communicated with the first processor with different communication protocols having different threshold value of the bandwidth and different communication contents, and,
   in response to the detection of the attack on FA network, the second processor is further configured to limit the flow rate of the communication according to a user-specified bandwidth value, and the first processor is further configured to output a notification to a user when the bandwidth exceeds the threshold value as to inform the user of the attack on the FA network based on the monitor setting information generated by the third processor.

6. A monitoring method of a monitoring system monitoring communication related to an FA network, the monitoring method comprising:
   a step in which a second processor coupled to a first processor of a control device coupled to and controlling a plurality of production devices in the FA network via a second network and a third processor communicatively coupled to the second processor via a first network different from the second network collect data indicating a status of communication on the FA network;

a step in which the third processor of the monitoring system receives and analyzes the data collected according to pre-registered information related to a setting of the communication on the FA network, and generates monitoring setting information for monitoring the communication, wherein the monitoring setting information comprises a threshold value of a bandwidth, a communication protocol and communication content for each of the plurality of production devices connected to the first processor, and at least two of the production devices are communicated with the first processor with different communication protocols having different threshold value of the bandwidth and different communication contents;

a step in which a first processor and the second processor of the monitoring system monitor communication to be monitored according to the monitoring setting information and detect an attack on the FA network by determining a flow rate of communication exceeds the threshold value of the bandwidth corresponding to the communication protocol of each production device to which the communication is directed;

a step in which limit the flow rate of the communication to be monitored according to a user-specified bandwidth value and output a notification to a user when the bandwidth exceeds the threshold value in response to the detection of the attack on the FA network based on the monitor setting information generated by the third processor, as to inform the user of the attack on the FA network.

7. The monitoring system according to claim 2, wherein the first processor and the second processor are included in a control device connected to the FA network.

8. The monitoring system according to claim 3, wherein the first processor and the second processor are included in a control device connected to the FA network.

9. The monitoring system according to claim 1, wherein the third processor transmits the monitoring setting information to the first and second processors, wherein the first processor creates or updates the control setting information and controls the production device based on the control setting information.

10. The monitoring system according to claim 1, wherein the third processor is included in a user terminal used to debug the first processor, the second processor and the production device.

* * * * *